(12) United States Patent
Moore, II et al.

(10) Patent No.: US 12,370,639 B1
(45) Date of Patent: Jul. 29, 2025

(54) BOLT ALIGNER AND METHOD OF USING THE SAME

(71) Applicant: GM Global Technology Operations LLC, Detroit, MI (US)

(72) Inventors: Navery C. Moore, II, Franklin, TN (US); Jeffrey A. Love, Lewisburg, TN (US); Raymond Carl Mendenhall, Spring Hill, TN (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/428,146

(22) Filed: Jan. 31, 2024

(51) Int. Cl.
  *B23P 19/10*  (2006.01)
  *B23P 19/00*  (2006.01)
  *B25J 11/00*  (2006.01)

(52) U.S. Cl.
  CPC ............. *B23P 19/10* (2013.01); *B23P 19/006* (2013.01); *B25J 11/005* (2013.01)

(58) Field of Classification Search
  CPC ... B25B 23/02; B25B 23/08–10; B25B 11/00; B25J 9/0096; B25J 11/005; B23P 19/006; B23P 19/10; B23P 19/12; F16B 5/0258; F16B 5/02
  See application file for complete search history.

(56) References Cited

U.S. PATENT DOCUMENTS

| 11,174,891 B2 * | 11/2021 | Shook ................... F16B 35/041 |
| 2006/0065222 A1 * | 3/2006 | Neal ........................ F02B 77/00 |
| | | 123/90.38 |

FOREIGN PATENT DOCUMENTS

| DE | 102009053130 A1 | 5/2011 |
| DE | 102021200922 A1 | 8/2022 |

\* cited by examiner

*Primary Examiner* — Matthew P Travers
(74) *Attorney, Agent, or Firm* — Honigman LLP; Matthew H. Szalach; Jonathan P. O'Brien

(57) ABSTRACT

A bolt aligner includes a body having a first surface, an opposite second surface, and a thickness between the first and second surfaces. The body may further include a first through hole extending from the first surface through the second surface, a bolt alignment feature arranged concentric with the first through hole and extending from the first surface through a portion of the thickness, a bumper chamber arranged concentric with the first through hole and extending from the second surface through a portion of the thickness, and a threaded portion arranged axially between the bolt alignment feature and the bumper chamber. The body may further include a second through hole extending from the first surface through the second surface and a third through hole extending from the first surface through the second surface. The bolt aligner further includes a bumper arranged in the bumper chamber.

16 Claims, 5 Drawing Sheets

BOLT ALIGNER AND METHOD OF USING THE SAME

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a device for aligning a bolt head with a socket and, more particularly, to a device for aligning a bolt head with a socket during a robot pick operation of the bolt.

Typically, aligning a socket with a bolt head of a bolt during a pick operation can be difficult due to the geometries of the bolt head and the socket. In an effort to align the socket with the bolt head, inadvertent rotation due to contact between the socket and the bolt head may result. Such rotation and movement of the bolt can lead to damage of threads of the bolt and wasted time during manufacturing. The shortcomings of existing devices and methods will be addressed by one or more aspects of the present disclosure.

SUMMARY

In one configuration, a bolt aligner is provided and includes a body that may include a first surface, an opposite second surface, and a thickness between the first and second surfaces. The body may further include a first through hole extending from the first surface through the second surface, a bolt alignment feature arranged concentric with the first through hole and extending from the first surface through a portion of the thickness, and a bumper chamber arranged concentric with the first through hole and extending from the second surface through a portion of the thickness. The body may further include a threaded portion arranged axially between the bolt alignment feature and the bumper chamber. The body may further include a second through hole extending from the first surface through the second surface and a third through hole extending from the first surface through the second surface. The bolt aligner includes a bumper arranged in the bumper chamber.

The bolt aligner may include one or more of the following optional features. For example, the threaded portion may be configured to constrain a bolt vertically. The bumper may be configured to constrain a bolt rotationally. Additionally or alternatively, the bumper may be made of an elastic material. The bolt aligner may further include one or more fasteners arranged in the second and third through holes for fastening the bolt aligner to a frame. The bumper may be trapped axially between the body and the frame. The bumper chamber may laterally align the bumper with the threaded portion of the body.

In one configuration, a nested assembly system is provided and includes a nest coupled to a frame. The nest may include a top side, a bottom side, and a thickness between the top side and the bottom side, a through hole extending from the top side through the bottom side, and a counter bore arranged concentric with the through hole. The nested assembly system includes a bolt aligner coupled to the frame. The bolt aligner may include a first surface, an opposite second surface, and a thickness between the first and second surfaces, a first through hole extending from the first surface through the second surface and aligned with the through hole of the nest, a bumper chamber arranged concentric with the first through hole and extending from the second surface through a portion of the thickness of the bolt aligner, and a threaded portion arranged axially in the first through hole. The nested assembly system includes a bumper arranged in the bumper chamber between the bolt aligner and the frame. The nested assembly system includes a washer comprising an opening and arranged in the counter bore and a bolt comprising a bolt shaft and a bolt head coupled to the bolt shaft. The bolt shaft extending through the opening of the washer and through the through hole of the nest. The nested assembly system includes a tool configured to be actuated clockwise, counterclockwise, and axially with respect to the bolt.

The nested assembly system may include one or more of the following optional features. For example, the bumper may be trapped between the bolt aligner and the frame. Additionally or alternatively, the bumper may be made of an elastic material, the bumper chamber may laterally align the bumper with the threaded portion of the body, the bolt head may be a hexagon shape, and/or the tool may be a hex bit socket. Clockwise rotation of the tool may thread the bolt shaft into the threaded portion of the bolt aligner. Rotation of the bolt may be stopped by the bumper.

In yet another configuration, a method for a nested assembly of a bolt and washer is provided. The method includes the steps of providing a washer comprising an opening into a counter bore, the opening being concentric with a through hole of a nest, inserting a bolt shaft of the bolt through the opening of the washer and the through hole so that a distal end of the bolt is in contact with a threaded portion of a bolt aligner, rotating a socket clockwise that is arranged axially above the bolt, contacting a bolt head coupled to the bolt shaft with the socket so that the bolt rotates clockwise, rotating the bolt into the threaded portion of the bolt aligner until clockwise rotation is stopped by a bumper, capturing the bolt head with the socket, rotating the bolt head and the washer counterclockwise with respect to the bolt aligner, and extracting the bolt and the washer from the nest with the socket.

The method for a nested assembly of a bolt and washer may include or more of the following optional features or steps. For example, capturing the bolt head with the socket may further include the socket receiving the bolt head axially when rotation of the bolt is stopped. Also, extracting the bolt and the washer may further include holding the bolt and the washer with a magnet that is arranged in the socket.

BRIEF DESCRIPTION OF THE DRAWINGS

The drawings described herein are for illustrative purposes only of selected configurations and are not intended to limit the scope of the present disclosure.

DETAILED DESCRIPTION

Figure 1:
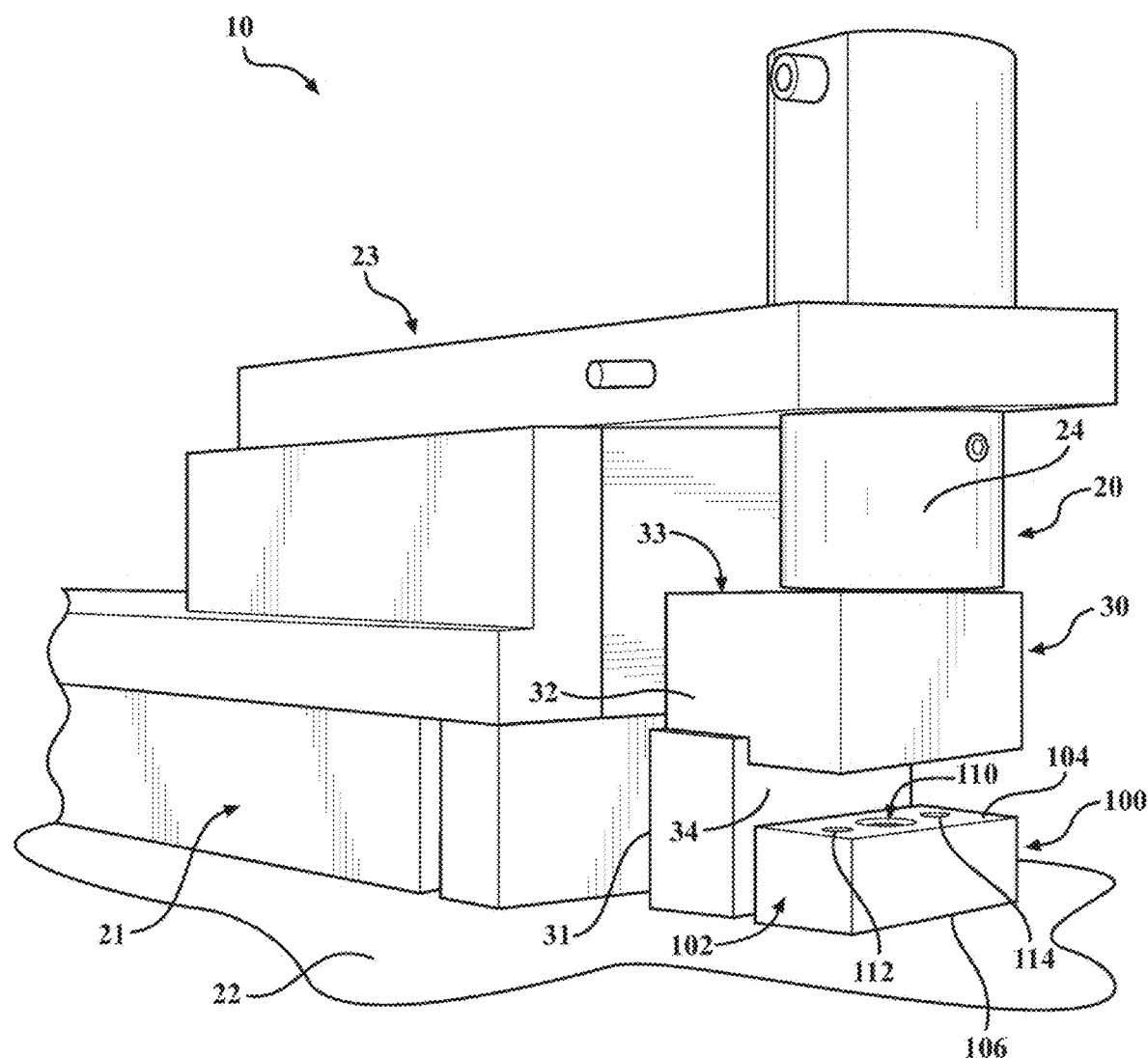
FIG. 1 is a fragmentary perspective view of a system including a robot, a nest, and a bolt aligner according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

With reference to FIG. 1, a nested assembly system 10 is shown including a robot 20, a nest 30, and a bolt aligner 100. In general, the robot 20 may include a base 21 that is coupled to a frame 22. The robot 20 may further include an assembly arm 23 coupled to a head 24. The assembly arm 23 can move laterally with respect to the base 21 so that head 24 can engage with the nest 30. When the robot 20 is aligned or otherwise engaged with the nest 30, the robot 20 may supply a washer 40 and a bolt 50 to the nest 30 via the head 24. The washer 40 and bolt 50 may be supplied to the nest 30 by other means, such as by a feeder or by an operator, for example. The head 24 can include a tool, such as a hex bit socket 25 (FIG. 3) or another tool that corresponds with the bolt 50, that is coupled to the head 24 and actuated (i.e., rotated) by a drivetrain (e.g., by a motor) arranged in the head 24.

Figure 3:
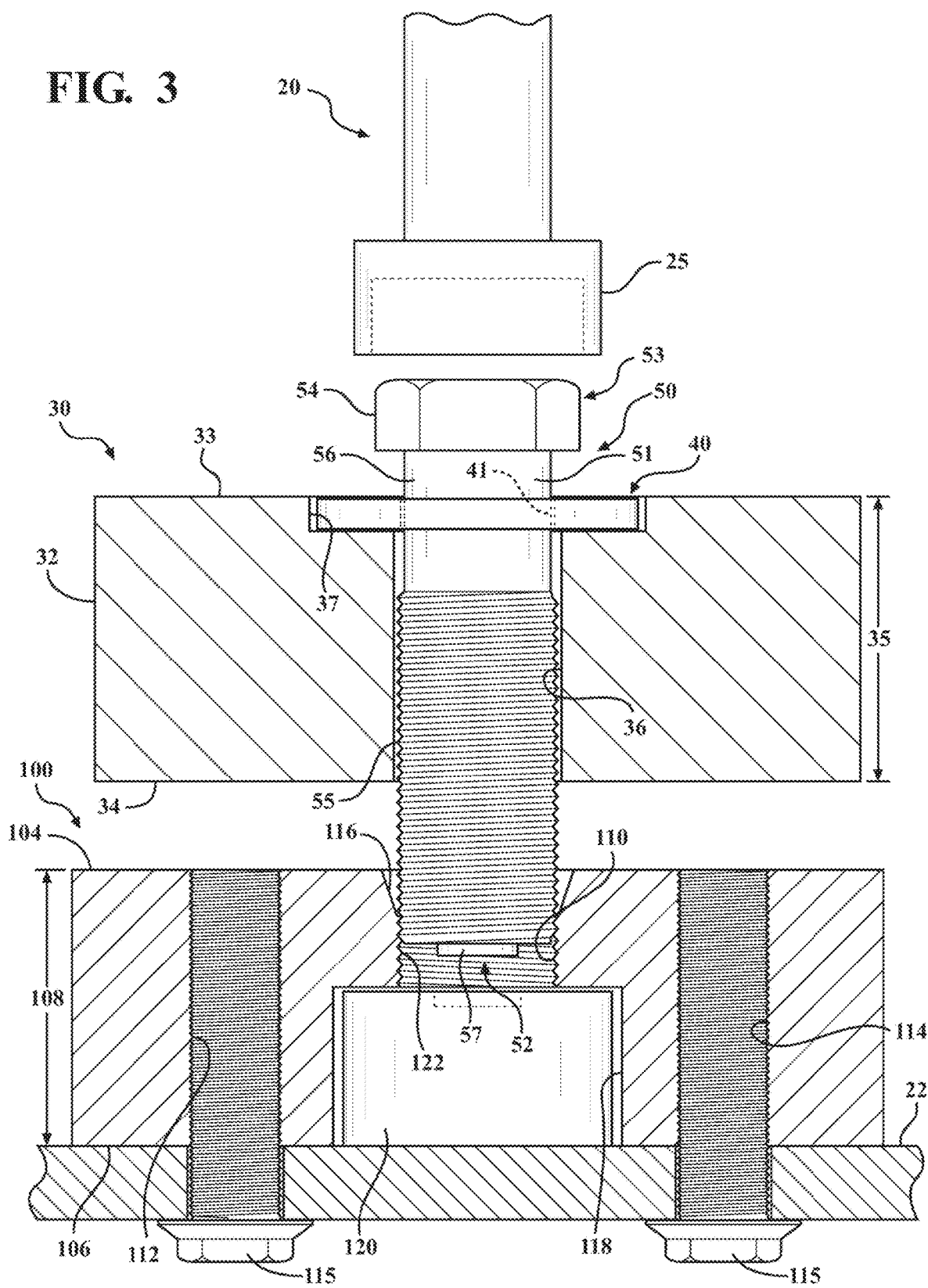
FIG. 3 is a cross-sectional view of the system of FIG. 1 according to the principles of the present disclosure.

With continued reference to FIG. 1, the nest 30 may be coupled to the frame 22 and arranged adjacent to the base 21 of the robot 20. In other words, the nest 30 may include a support 31 which is coupled to the frame 22 and a main body 32 which is coupled to the support 31 so as to be arranged axially from frame 22. With reference to FIG. 3, the main body 32 can include a top side 33, a bottom side 34, and a thickness 35 between the top side 33 and the bottom side 34. A through hole 36 may be arranged in the main body 32 so as to extend from the top side 33 through the bottom side 34. The thickness 35 of the main body 32 and the diameter of the through hole 36 may be selected based on dimensions (e.g., shaft diameter and shaft length) of the bolt 50 so that the bolt 50 can be easily inserted through the through hole 36 and a portion of the bolt 50 extends beyond the bottom side 34 of the main body 32. A counter bore 37 can be arranged concentric with the though hole 36. The counter bore 37 may extend into the main body 32 so that the washer 40 may be laterally constrained within the counter bore 37 during assembly.

The washer 40 may be a standard flat washer with an opening 41 or another washer that is used in the automotive industry, for example. As best shown in FIG. 3, the bolt 50 can include a shaft 51 that has distal end 52 and proximal end 53. A bolt head 54 may be coupled to the bolt shaft 51 near the proximal end 53. The bolt head 54 may be a hexagon shape or another shape that corresponds with a tool such as the socket 25. A threaded portion 55 may be arranged along a portion of the shaft 51 between a shank 56 and a point 57, for example. The shank 56 may be arranged axially along the shaft 51 between the bolt head 54 and the threaded portion 55. The point 57 may extend axially from the threaded portion 55 and be arranged at the distal end 52 of the bolt shaft 51. Note, during operation or assembly, other bolts may be selected or used that look different and/or include different features than the bolt 50 shown throughout the figures. For instance, the bolt shaft 51 may not include a shank 56 and/or a point 57. Rather, the threaded portion 55 may extend the entire length of the shaft 51.

Figure 2A:
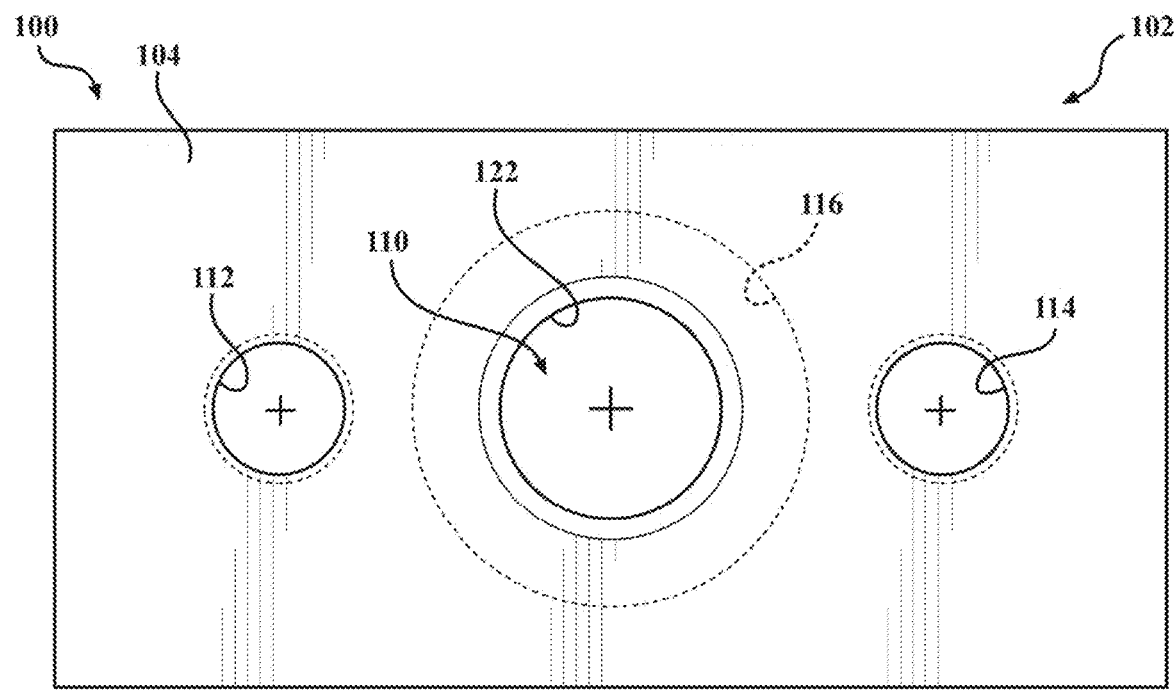
FIG. 2A is a top view of the bolt aligner of FIG. 1.
Figure 2B:
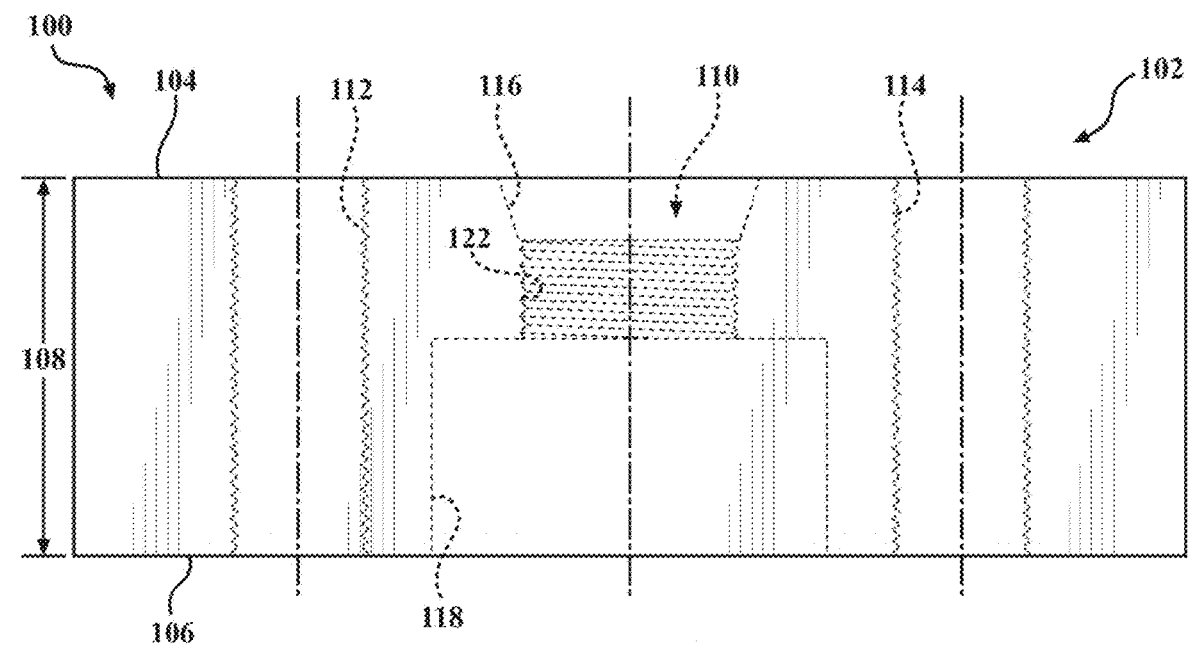
FIG. 2B is a side view of the bolt aligner of FIG. 1.

With reference to FIGS. 2A and 2B, the bolt aligner 100 is shown including a body 102 comprising a first or upper surface 104, an opposite second or lower surface 106, and a thickness 108 extending between the first and second surfaces 104, 106. The body 102 can include a first through hole 110, a second through hole 112, and a third through hole 114 all extending from the upper surface 104 through the bottom surface 106. The second and third through holes 112, 114 may be configured (e.g., tapped or threaded) to receive a fastener 115 (e.g., a mounting bolt) for securing the bolt aligner 100 to the frame 22, as shown in FIG. 3, for example. A counter sink or bolt alignment feature 116 may be arranged concentric with the first through hole 110 and may extend from the upper surface 106 through a portion of the thickness 108. The alignment feature 116 may be desirable for locating the bolt 50 within the first through hole 110. The body 102 may also include a counter bore or bumper chamber 118 arranged concentric with the first though hole 110 and extending from the lower surface 106 through a portion of the thickness 108. The bumper chamber 118 may be configured to receive a bumper 120 (FIG. 3) that is made of a rubber, polymeric, or another material suitable for elastic deformation, for example. As shown in FIG. 3, the bumper 120 may be trapped axially between the bolt aligner 100 and the frame 22 so that the bumper 120 cannot be readily removed from the bumper chamber 118. A threaded portion 122 may be arranged axially in the first through hole 110. As shown in FIG. 3, the threaded portion 122 may be arranged axially between the alignment feature 116 and the bumper chamber 118. The threaded portion 122 can correspond with the threaded portion 55 of the bolt 50 so that the threaded portion 55 may be threaded into the threaded portion 122 of the bolt aligner 100. Also, the bumper chamber 118 may laterally align the bumper 120 with the threaded portion 122 so that the bolt 50 can contact the bumper 120.

Figure 4:
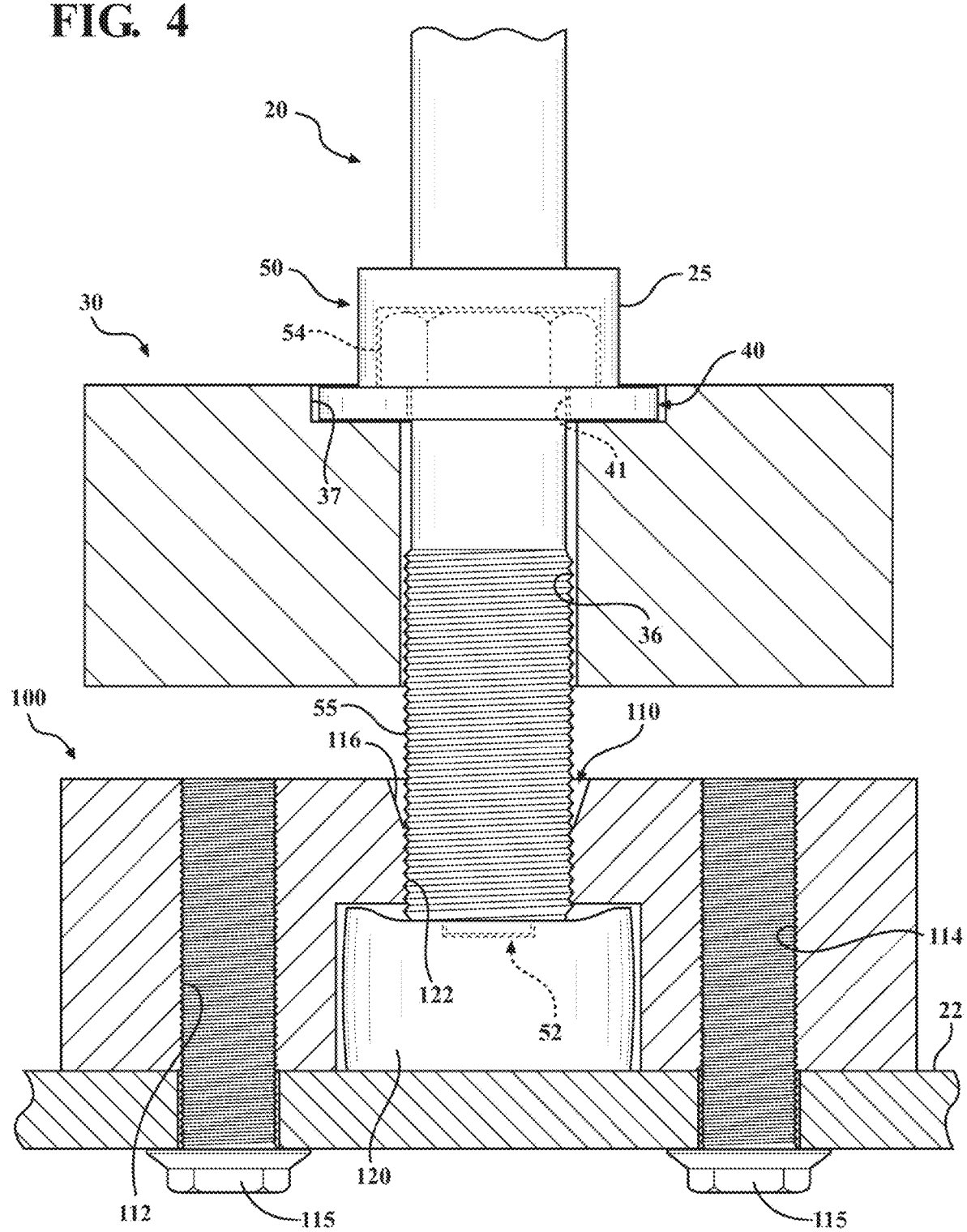
FIG. 4 is a cross-sectional view of the system of FIG. 1 according to the principles of the present disclosure.
Figure 5:
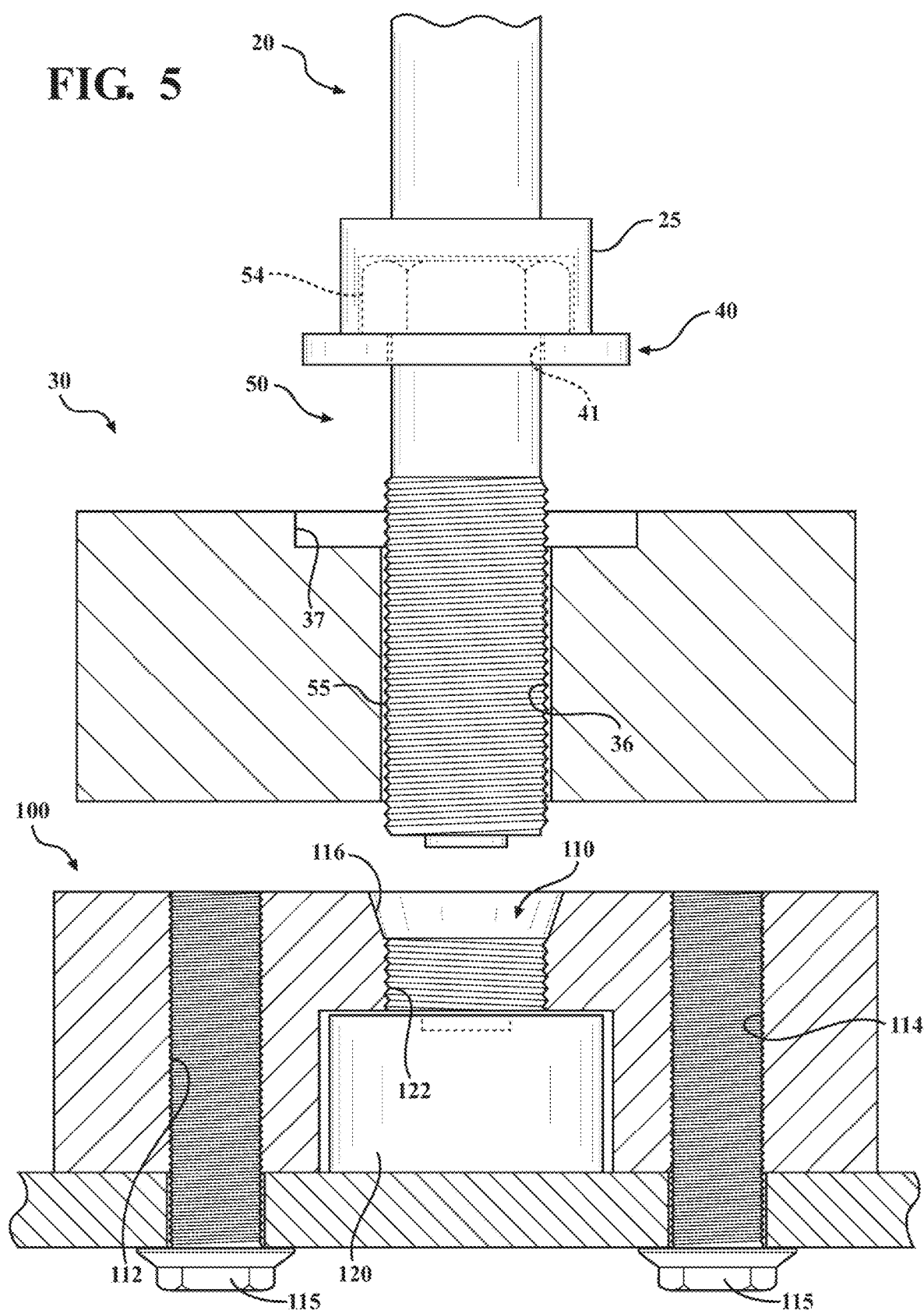
FIG. 5 is a cross-sectional view of the system of FIG. 1 according to the principles of the present disclosure.

With reference to FIGS. 3-5, a method for a nested assembly of the bolt 50 and washer 40 with the bolt aligner 100 will be discussed in greater detail below. With specific reference to FIG. 3, the washer 40 may be provided and arranged in the counter bore 37 of the nest 30 so that the opening 41 is generally concentric with the through hole 36. As shown, the bolt 50 can be provided and arranged through the opening 41 of the washer 40 and extend through the through hole 36 of the nest 30 so that a portion of the bolt 50 extends beyond the bottom side 34 of the nest 30. As shown, the distal end 52 of the bolt 50 may rest on and/or contact the threaded portion 122 of the bolt aligner 100. At this point, the nested assembly system 10 can begin a pick operation of the bolt 50 and the washer 40. The socket 25 may be actuated clockwise (e.g., via the drivetrain or otherwise) and be moved axially (e.g., by the robot 20 or otherwise) so that the socket 25 contacts the bolt head 54. As a result, the contact between the socket 25 and the bolt head 54 will cause the bolt 50 to be rotated clockwise within the nest 30. Without the bolt aligner 100, the bolt 50 would typically spin continuously until the socket 25 and the bolt head 54 align with one another, which commonly results in damage to the threads of the bolt as a result of contact between the threads and through hole of the nest. Here, however, as a result of the contact between the socket 25 and the bolt head 54, the threaded portion 55 of the bolt 50 is threaded into the threaded portion 122 of the first through hole 110 of the bolt aligner 100. Thus, the bolt 50 can be constrained vertically by the threaded portion 122 of the bolt aligner 100. The bolt 50 can continue to be threaded into the bolt aligner 100 until the bolt 50 contacts the bumper 120 which can hinder rotation of the bolt 50.

With reference to FIG. 4, the bumper 120 can eventually stop rotation of the bolt 50 due to friction between the bolt 50 and the bumper 120, for example. As shown, the bumper 120 may be made of material that is configured to elastically deform as the bolt 50 is rotated into the threaded portion 122 of the bolt aligner 100. The contact between the bolt 50 and the bumper 120 can constrain the bolt 50 rotationally so that the bolt 50 stops rotating clockwise. Thus, the bumper 120 may prevent further rotation of the bolt 50 even if the socket 25 is still making contact with the bolt head 54. By constraining the bolt 50 vertically and rotationally, aligning the socket 25 with the bolt head 54 so that the socket 25 can capture the bolt head 54 becomes more likely. In other words, when the bolt 50 is no longer rotating due to contact by the rotating socket 25, the geometry of the socket 25 (e.g., hexagon) can more easily align with the geometry of the bolt head 54 (e.g., hexagon) so that the bolt head 54 can be received by the socket 25. This may be desirable to save time during manufacturing operations, for example.

With reference to FIG. 5, once the socket 25 has captured the bolt head 54, the bolt 50 and the washer 40 may be held together within the socket 25 (e.g., via a magnet within the socket 25 or otherwise). In order to complete the pick operation of the bolt 50 and the washer 40, the socket 25 may be actuated counterclockwise (e.g., via the drivetrain or otherwise) so that the threaded portion 55 of the bolt 50 is unthreaded from the threaded portion 122 of the bolt aligner 100. Removing the bolt 50 from the threaded portion 122 frees the bolt 50 from any axial constraint with respect to the bolt aligner 100 and, thus, may be extracted axially out of the nest 30 with the washer 40, as shown in FIG. 5.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An assembly, comprising:
   a frame; and
   a bolt aligner, comprising:
      a body, comprising:
         a first surface, an opposite second surface, and a thickness between the first and second surfaces,
         a first through hole extending from the first surface through the second surface,
         a bolt alignment feature arranged concentric with the first through hole and extending from the first surface through a portion of the thickness,
         a bumper chamber arranged concentric with the first through hole and extending from the second surface through a portion of the thickness, the bumper chamber including an upper surface spaced from the first surface of the body and side walls extending between the upper surface and the second surface of the body,
         a threaded portion arranged axially between the bolt alignment feature and the bumper chamber,
         a second through hole extending from the first surface through the second surface, and
         a third through hole extending from the first surface through the second surface;
      fasteners arranged in the second through hole and the third through hole and coupled to the frame; and a bumper trapped axially between the upper surface and the frame and laterally between the side walls.

2. The assembly of claim 1, wherein the threaded portion is configured to constrain a bolt vertically.

3. The assembly of claim 1, wherein the bumper is configured to constrain a bolt rotationally.

4. The assembly of claim 1, wherein the bumper is made of an elastic material.

5. The assembly of claim 1, wherein the bumper is compressible by a bolt between the upper surface, the frame, and the side walls.

6. A nested assembly system, comprising:
   a nest coupled to a frame, the nest comprising:
      a top side, a bottom side, and a thickness between the top side and the bottom side,
      a through hole extending from the top side through the bottom side, and
      a counter bore arranged concentric with the through hole;
   a bolt aligner coupled to the frame, the bolt aligner comprising:
      a body comprising:
         a first surface, an opposite second surface, and a thickness between the first and second surfaces,
         a first through hole extending from the first surface through the second surface and aligned with the through hole of the nest,
         a bolt alignment feature arranged concentric with the first through hole and extending from the first surface through a portion of the thickness of the bolt aligner,
         a bumper chamber arranged concentric with the first through hole and extending from the second surface through a portion of the thickness of the bolt aligner, the bumper chamber including an upper surface spaced from the first surface and side walls extending between the upper surface and the second surface of the body,
         a threaded portion arranged axially between the bolt alignment feature and the bumper chamber;
         a second through hole extending from the first surface through the second surface, and
         a third through hole extending from the first surface through the second surface;
      fasteners arranged in the second through hole and the third through hole and coupled to the frame; and
      a bumper arranged in the bumper chamber and trapped axially between the upper surface and the frame and laterally between the side walls;
   a washer comprising an opening and arranged in the counter bore;
   a bolt comprising a bolt shaft and a bolt head coupled to the bolt shaft, the bolt shaft extending through the opening of the washer and through the through hole of the nest; and
   a tool configured to be actuated clockwise, counterclockwise, and axially with respect to the bolt.

7. The nested assembly system of claim 6, wherein the bumper is made of an elastic material.

8. The nested assembly system of claim 6, wherein the bumper chamber laterally aligns the bumper with the threaded portion of the bolt aligner.

9. The nested assembly system of claim 6, wherein the bolt head is a hexagon shape.

10. The nested assembly system of claim 9, wherein the tool is a hex bit socket.

11. The nested assembly system of claim 6, wherein clockwise rotation of the tool threads the bolt shaft into the threaded portion of the bolt aligner.

12. The nested assembly system of claim 11, wherein rotation of the bolt is stopped by the bumper.

13. The nested assembly system of claim 6, wherein the through hole of the nest, the first through hole of the bolt aligner, and the bumper chamber are concentric.

14. A method of using the nested assembly system of claim 6, comprising:
   providing the washer into the counter bore so that the opening is concentric with the through hole of the nest;
   inserting the bolt shaft of the bolt through the opening of the washer and the through hole so that a distal end of the bolt is in contact with the threaded portion of the bolt aligner;
   rotating the tool, that is arranged axially above the bolt, clockwise;
   contacting the bolt head coupled to the bolt shaft with the tool so that the bolt rotates clockwise;
   rotating the bolt into the threaded portion of the bolt aligner until clockwise rotation is stopped by the bumper;
   capturing the bolt head with the tool;
   rotating the bolt head and the washer counterclockwise with respect to the bolt aligner; and
   extracting the bolt and the washer from the nest with the tool.

15. The method of claim 14, wherein capturing the bolt head with the tool further comprises the tool receiving the bolt head axially when rotation of the bolt is stopped.

16. The method of claim 14, wherein the extracting the bolt and the washer further comprises holding the bolt and the washer with a magnet that is arranged in the tool.

* * * * *